(12) United States Patent
Sharma et al.

(10) Patent No.: US 12,554,133 B2
(45) Date of Patent: Feb. 17, 2026

(54) LIGHTWEIGHT PUPIL REPLICATOR

(71) Applicant: GM Global Technology Operations LLC, Detroit, MI (US)

(72) Inventors: Manoj Sharma, Troy, MI (US); Thomas A. Seder, Fraser, MI (US); Kai-Han Chang, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 695 days.

(21) Appl. No.: 18/049,662

(22) Filed: Oct. 26, 2022

(65) Prior Publication Data

US 2024/0142776 A1    May 2, 2024

(51) Int. Cl.
| | |
|---|---|
| *G02B 27/01* | (2006.01) |
| *F21V 8/00* | (2006.01) |
| *G02B 27/10* | (2006.01) |
| *G02B 27/14* | (2006.01) |

(52) U.S. Cl.
CPC ....... *G02B 27/0103* (2013.01); *G02B 6/0018* (2013.01); *G02B 6/0036* (2013.01); *G02B 27/106* (2013.01); *G02B 27/14* (2013.01)

(58) Field of Classification Search
None
See application file for complete search history.

(56) References Cited

U.S. PATENT DOCUMENTS

| | | | |
|---|---|---|---|
| 2007/0139960 A1* | 6/2007 | Tsai | G02B 6/0035 362/625 |
| 2008/0030866 A1* | 2/2008 | Yamazaki | G02B 27/095 359/639 |
| 2022/0113540 A1* | 4/2022 | Choi | G02B 6/0091 |
| 2022/0155502 A1* | 5/2022 | Melli | G02B 27/0172 |

* cited by examiner

*Primary Examiner* — Derek S. Chapel
(74) *Attorney, Agent, or Firm* — Vivacqua Crane, PLLC

(57) ABSTRACT

A pupil replicator for a head up display system includes a waveguide adapted to receive an incoming image beam, and including a transparent body having a partially transmissive top surface and a reflective bottom surface, a Dammann grating adapted to create a plurality of duplicate image beams having equal intensity, and reflect each of the plurality of duplicate image beams within the waveguide, and a beam aligning device adapted to receive each of the plurality of duplicate image beams and to reflect each of the plurality of duplicate image beams at a common angle relative to the waveguide, wherein, after being reflected by the beam aligning device, each of the plurality of duplicate image beams are parallel to one another.

17 Claims, 4 Drawing Sheets

LIGHTWEIGHT PUPIL REPLICATOR

INTRODUCTION

The present disclosure relates to a pupil replicator for a head up display. Conventional pupil replicators take up a significant amount of space and add mass to the system. Reducing the weight and size of head up display systems is a primary goal when designing head up systems.

Thus, while current pupil replicators for head up systems achieve their intended purpose, there is a need for a new and improved pupil replicator that provides satisfactory expansion of the eye-box and is smaller and lighter than conventional pupil replicators.

SUMMARY

According to several aspects of the present disclosure, a pupil replicator for a head up display system includes a waveguide adapted to receive an incoming image beam, a Dammann grating adapted to create a plurality of duplicate image beams having equal intensity, each duplicate image beam being identical to the incoming image beam, and reflect each of the plurality of duplicate image beams within the waveguide, and a beam aligning device adapted to receive each of the plurality of duplicate image beams and to reflect each of the plurality of duplicate image beams at a common angle relative to the waveguide, wherein, after being reflected by the beam aligning device, each of the plurality of duplicate image beams are parallel to one another.

According to another aspect, the waveguide includes a transparent body having a partially transmissive top surface and a reflective bottom surface.

According to another aspect, the Dammann grating is positioned adjacent the transmissive top surface.

According to another aspect, the Dammann grating is etched into the transmissive top surface.

According to another aspect, the beam aligning device includes a plurality of beam aligning prisms.

According to another aspect, the plurality of beam aligning prisms include portions of the reflective bottom surface extending outward from the waveguide.

According to another aspect, the plurality of beam aligning prisms include portions of the reflective bottom surface extending inward into the waveguide.

According to another aspect, the beam aligning device includes at least one holographic optical element.

According to another aspect, the holographic optical element includes a reflective hologram written into a carrier material which is attached to the reflective bottom surface of the waveguide.

According to another aspect, an air-glass interface of the reflective bottom surface has a reflectivity of 100 percent.

According to another aspect, the incoming image beam enters the transparent body of the waveguide, the transparent body of the waveguide allowing 100 percent transmittance of the incoming image beam into the transparent body of the waveguide.

According to another aspect, the transmissive top surface includes a first region and a second region, and wherein, for each of the duplicate image beams a first identical replication of the incoming image beam is transmitted through the transmissive top surface within the first region, and a second identical replication of the incoming image beam is transmitted through the transmissive top surface within the second region.

According to another aspect, the first region of the transmissive top surface allows a first predetermined level of transmittance, and the second region of the transmissive top surface allows a second predetermined level of transmittance, the second predetermined level of transmittance being greater than the first predetermined level of transmittance.

According to another aspect, each of the first and second identical replications of the incoming image beam for each of the duplicate image beams has the same intensity.

According to another aspect, the waveguide is formed from one of glass and transparent plastic.

According to another aspect, the top transmissive surface includes at least one extraction holographic optical element.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1A:
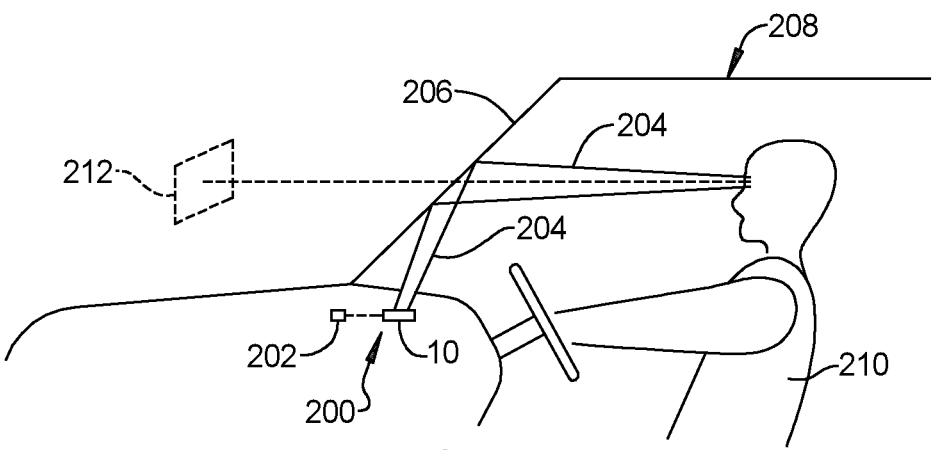
FIG. 1A is a schematic side view of an automobile having a head up display system.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Referring to FIG. 1A, a head-up display (HUD) system 200 includes a hologram projector 202 that is adapted to project a holographic image 204 onto a windshield 206 of an automobile 208. A passenger 210 within the automobile 208 sees the projected image 204 on the windshield 206 and perceives a virtual image 212 at a distance in front of the windshield 206. In an exemplary embodiment, the HUD system 200 includes a pupil replicator 10.

Figure 1B:
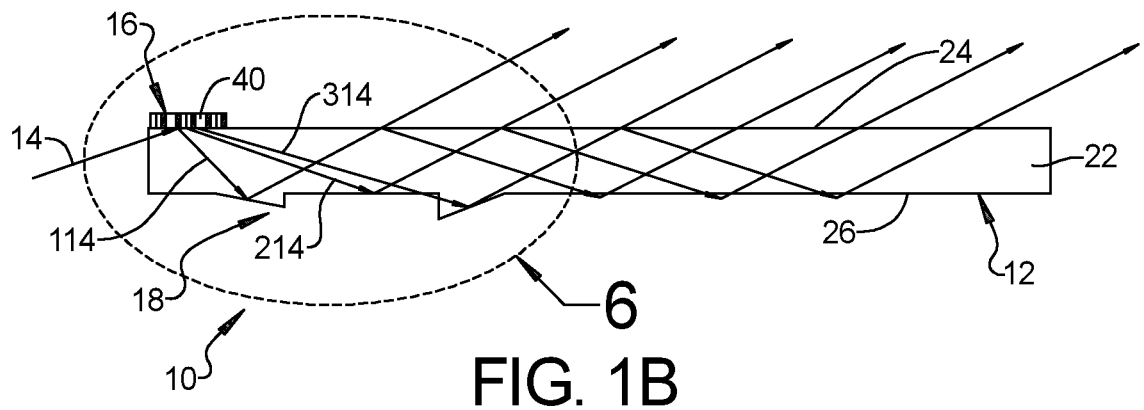
FIG. 1B is a schematic side sectional view of a pupil replicator according to an exemplary embodiment of the present disclosure.

Referring to FIG. 1B, a pupil replicator 10 for a head up display system includes a waveguide 12 adapted to receive an incoming image beam 14. A Dammann grating 16 is adapted to create a plurality of duplicate image beams 114, 214, 314 having equal intensity, each duplicate image beam 114, 214, 314 being identical to the incoming image beam 14. The Dammann grating 16 is further adapted to reflect each of the plurality of duplicate image beams 114, 214, 314 within the waveguide 12. A beam aligning device 18 is adapted to receive each of the plurality of duplicate image beams 114, 214, 314 and to reflect each of the plurality of duplicate image beams 114, 214, 314 at a common angle 20 relative to the waveguide 12, wherein, after being reflected by the beam aligning device 18, each of the plurality of duplicate image beams 114, 214, 314 are parallel to one another.

Figure 2:
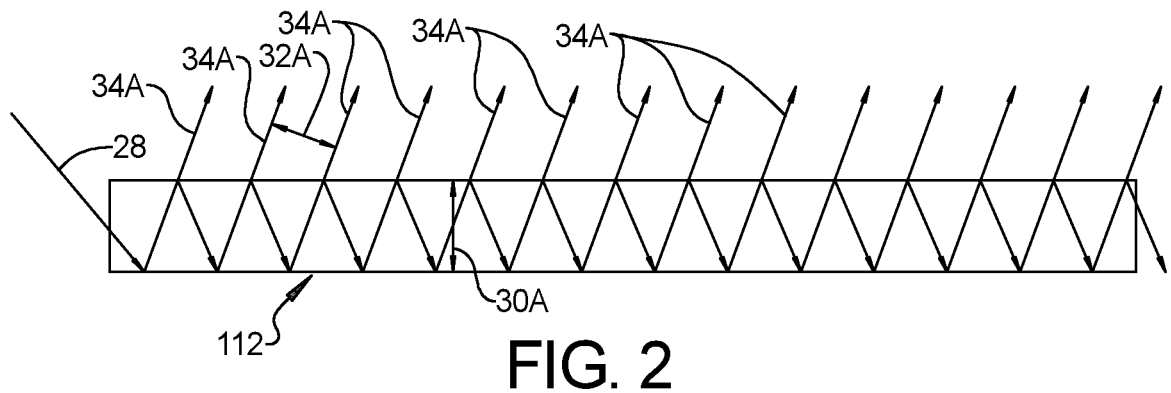
FIG. 2 is a schematic side sectional view of a conventional pupil replicator having an optimal thickness.

In an exemplary embodiment, the waveguide 12 is made from glass or plastic and includes a transparent body 22 having a transmissive top surface 24 and a reflective bottom surface 26. Referring to FIG. 2, in a conventional waveguide 112 a holographic image beam 28 is projected into the body of the waveguide 112 and then propagates inside the waveguide 112 and is extracted multiple times. The re-circulation of the light several times within the waveguide 112 expands the pupil so the viewer can see the holographic image 28 from an extended eye-box. In addition to expanding the eye-box, the pupil replicator 10 also magnifies the original projected image.

Of primary importance when designing head up system is weight and size of the system. Often, waveguides 112 are made from glass or heavy plastics, adding significant weight to the system. One way to reduce the size and weight of the head up system is to make the waveguide 112 thinner. Unfortunately, this increases a gap distance between the image replications that are extracted from the waveguide 112. Referring again to FIG. 2, when the thickness 30A of the waveguide 112 is optimal, a gap 32A between adjacent extracted image replications 34A is small enough to ensure that as a user of the head up system moves, the user will see a continuous image. A gap 32A between each of the image replications 34A should be smaller than a predetermined minimum human pupil size to ensure the continuity of virtual images while the viewer's eyes are moving within the eye box, Where the predetermined minimum human pupil size may be approximately equal to or equal to 2 millimeters (mm), for example, the gap 32A between each of the image replications 34A satisfies the relationship:

0 mm≤gap 32A≤predetermined minimum human pupil size (e.g., 2 mm).

Figure 3:
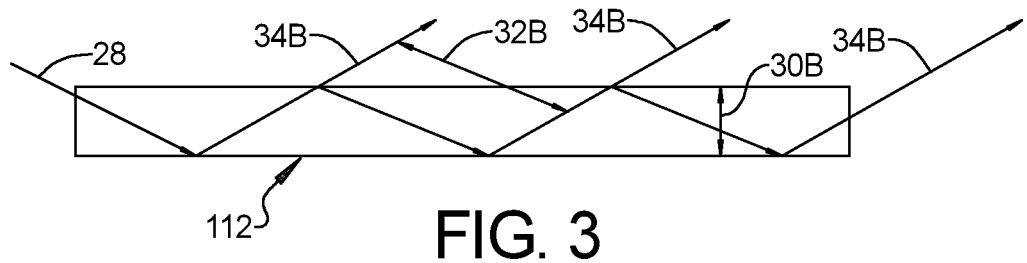
FIG. 3 is a schematic side sectional view of a conventional pupil replicator having a thickness less than optimal.

The gap 32A satisfying the above relationship ensures that the image replications 34A do not overlap one another. Also, if a pupil is located in the gap 32A between two of the image replications 34A, the eye is still able to view part of the image and maintain image continuity. Referring to FIG. 3, when the thickness 30B of the waveguide 112 is reduced, the image 28 is reflected within the waveguide 112 at a more shallow angle, and thus, a gap 32B between the image replications 34B becomes larger, Thus, reducing the weight and size of the waveguide 112 by making the waveguide 112 thinner may compromise the quality of the image perceived by the user.

The Dammann grating 16 is adapted receive an incoming image beam 14 and to create a plurality of duplicate image beams 114, 214, 314 having equal intensity, each duplicate image beam 114, 214, 314 being identical to the incoming image beam 14, and reflects each of the plurality of duplicate image beams 114, 214, 314 within the waveguide 12. This reduces the gap between adjacent image replications that are extracted from the waveguide 12.

Referring again to FIG. 1B, in an exemplary embodiment, the incoming image beam 14 enters the transparent body 22 of the waveguide 12. The transparent body 22 of the waveguide 12 allows 100 percent transmittance of the incoming image beam 14 into the transparent body 22 of the waveguide 12. The image is received by the Dammann grating 16. The Dammann grating 16 splits the incoming image beam 14 into three duplicate image beams 114, 214, 314 having equal intensity. Each of the three duplicate image beams 114, 214, 314 is identical to the incoming image beam 14. The Dammann grating 16 then reflects each of the three duplicate image beams 114, 214, 314 within the waveguide 12, wherein each of the three duplicate image beams 114, 214, 314 is replicated by the waveguide 12. As shown in FIG. 1B, each of the three duplicate image beams 114, 214, 314 is replicated twice by the waveguide 12. It should be understood by those skilled in the art that the Dammann grating 16 may be able to create any suitable number of duplicate image beams 114, 214, 314. It should be further understood by those skilled in the art that the waveguide 12 may be adapted to provide any suitable number greater than or equal to two replications of each of the duplicate image beams 114, 214, 314.

When light is incident on a surface with a profile that is irregular at length scales comparable to the wavelength of the light, it is reflected and refracted at a microscopic level in many different directions as described by the laws of diffraction. If the surface irregularity is periodic, such as a series of grooves etched into a surface, light diffracted from many periods in certain special directions constructively interferes, yielding replicas of the incident beam propagating in those directions.

Figure 4:
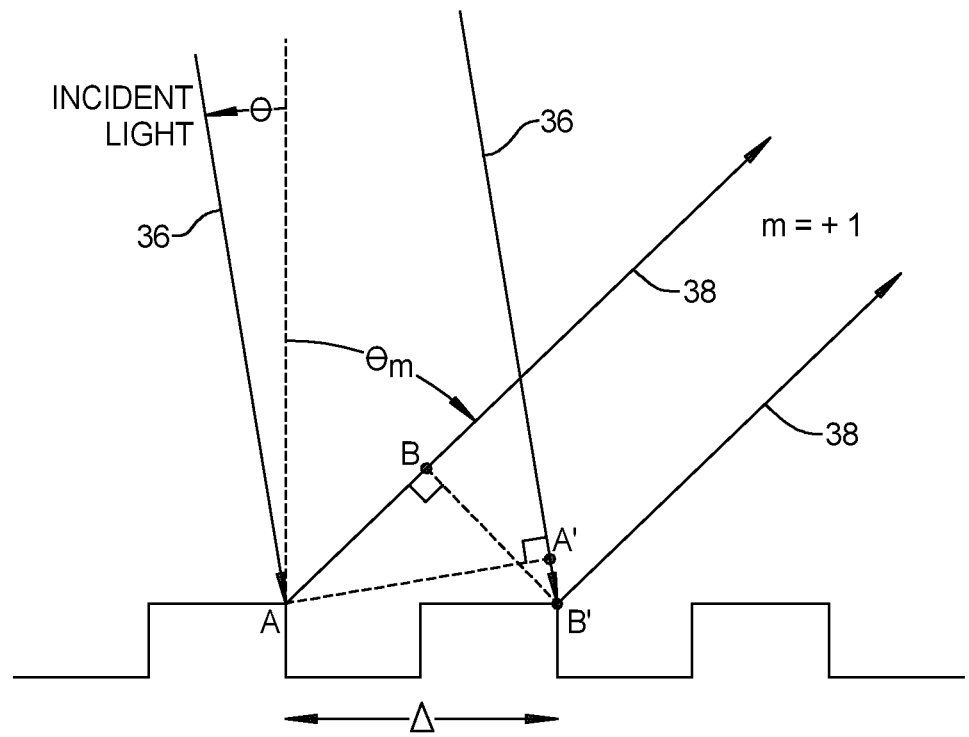
FIG. 4 is a schematic diagram illustrating the function of a Dammann grating.

Referring to FIG. 4, a beam of light is represented by two parallel first rays 36 incident on the binary (rectangular profile) grating shown. The light is diffracted in many directions, only one of which is indicated by second rays 38. If the difference between adjacent first-second ray 36, 38 paths diffracted off of identical locations on adjacent periods is equal to a multiple of the wavelength of light, the second rays 38 interfere constructively.

Mathematically, the difference between paths AB and A'B' is a multiple of the wavelength when AB−A'B'=mA, where m is an integer and A is the wavelength of light (typically stated in nm). Since AB=Λ sin $\theta_m$ and A'B'=Λ sin θ, where Λ is the grating period and $\theta_m$ and θ are the angles of diffraction and incidence, respectively, relative to the surface normal, the condition for constructive interference is:

$$\sin\theta_m = \sin\theta + m\frac{\lambda}{\Lambda}.$$

This is the well-known Grating Equation. For a given angle of incidence, θ, it gives the angle of diffraction $\theta_m$ for each "order" m for which a solution to the Grating Equation. Often gratings are described by the frequency of grating lines instead of the period, where f (in lines/mm) is equal to $10^6/\Lambda$ (for Λ in nm). In terms of f the grating equation becomes:

$$\sin\theta_m = \sin\theta + m\lambda f \times 10^{-6}.$$

Figure 5:
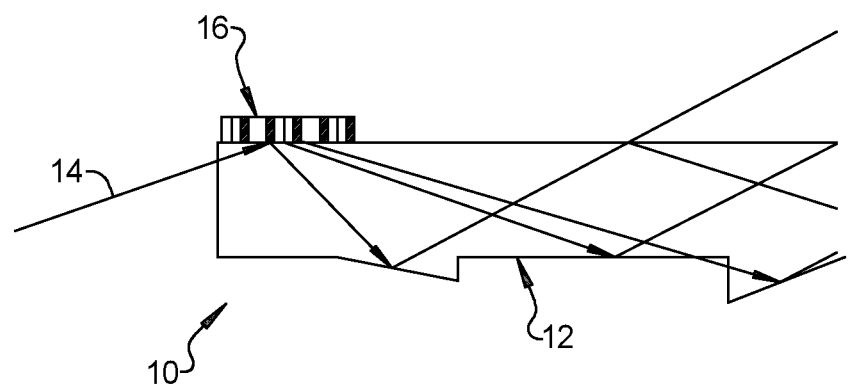
FIG. 5 is a schematic side sectional view of a pupil replicator having a Dammann grating etched into the transmissive top surface of the waveguide.

Referring again to FIG. 1B, in an exemplary embodiment, the Dammann grating 16 may be printed onto a carrier material 40 and positioned adjacent to and in contact with the transmissive top surface 24. Referring to FIG. 5, in another exemplary embodiment, the Dammann grating 16 is etched into the transmissive top surface 24.

It is important that all the reflected duplicate image beams 114, 214, 314 are equally spaced and travelling parallel within the waveguide 12 to ensure the quality of the image perceived by a user of the head up system incorporating a pupil replicator 10 in accordance with the present disclosure. The beam aligning device 18 is adapted to receive each of the plurality (as shown, three) of duplicate image beams 114, 214, 314 and to reflect each of the plurality of duplicate image beams 114, 214, 314 at a common angle 20 relative to the waveguide 12, wherein, after being reflected by the beam aligning device 18, each of the plurality of duplicate image beams 114, 214, 314 are parallel to one another.

Figure 6:
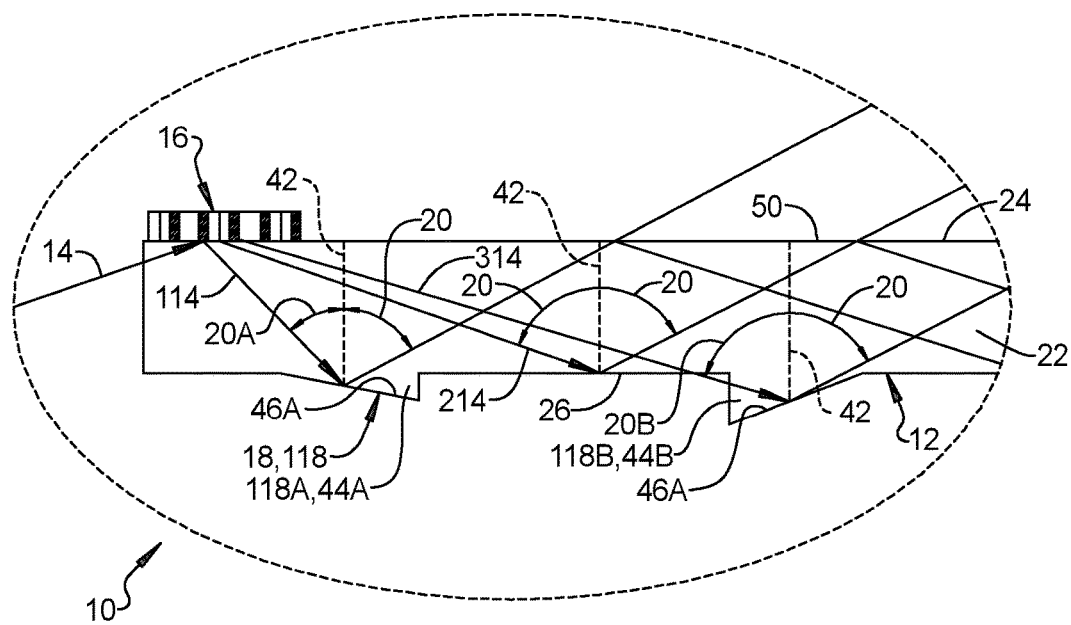
FIG. 6 is an enlarged view of a portion of FIG. 1B, as indicated in FIG. 1.

Referring again to FIG. 1B, in an exemplary embodiment, the beam aligning device 18 includes a region of the reflective bottom surface of the waveguide that includes a plurality of beam aligning prisms 118. As shown, the incoming image beam 14 is received by the waveguide 12 and split, by the Dammann grating 16 into three duplicate image beams 114, 214, 314. Each of the three duplicate image beams 114, 214, 314 travels at a different angle relative to a vertical axis of the pupil replicator 10. Referring to FIG. 6, for example, the first duplicate image beam 114 is reflected by the Dammann grating 16 downward toward the reflective bottom surface 26 of the waveguide 12 at a twenty-five degree angle 20A. The second duplicate image beam 214 is reflected by the Dammann grating 16 downward toward the reflective bottom surface 26 of the waveguide 12 at a thirty degree angle 20. Finally, the third duplicate image beam 314 is reflected by the Dammann grating 16 downward toward the reflective bottom surface 26 of the waveguide 12 at a thirty-five degree angle 20B. Note, for this example, thirty degrees is the common angle 20 at which all the duplicate image beams 114, 214, 314 should be reflected at.

The first duplicate image beam 114 is reflected by a first beam aligning prism 118A such that the first duplicate image 114 is reflected upward toward the transmissive upper surface of the waveguide at a thirty degree angle 20. The second duplicate image beam 214 is already travelling at an angle that is thirty degrees relative to the vertical axis 42, and therefore, is reflected by the reflective bottom surface 26 of the waveguide 12 without modification by a beam aligning prism 118. The third duplicate image beam 314 is reflected by a second beam aligning prism 118B such that the third duplicate image 314 is reflected upward toward the transmissive top surface 24 of the waveguide 12 at a thirty degree angle 20. Thus, after being reflected by the beam aligning device 18, each of the three duplicate image beams 114, 214, 314 travels within the waveguide 12 parallel to one another and at a thirty degree angle 20 relative to the waveguide 12 and equally spaced.

As shown in FIG. 1B and FIG. 6, in an exemplary embodiment, the plurality of beam aligning prisms 118A, 118B includes portions 44 of the reflective bottom surface 26 extending outward from the waveguide 12. The portions 44 that extend outward from the body 22 of the waveguide 12 includes surfaces 46 that are adapted to reflect the duplicate image beams 114, 214, 314 such that the duplicate image beams 114, 214, 314 are parallel to one another and equally spaced.

Figure 7:
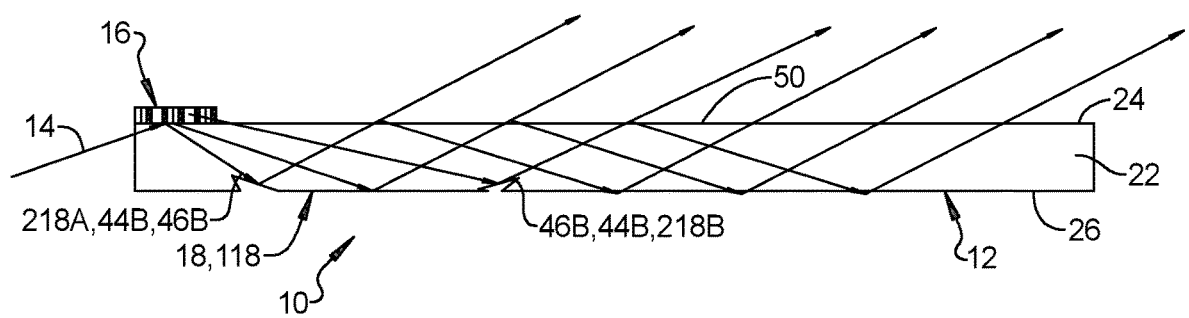
FIG. 7 is a schematic side sectional view of a pupil replicator having portions of the reflective bottom surface extending inward into the body of the waveguide.

Referring to FIG. 7, in another exemplary embodiment, the plurality of beam aligning prisms 218A, 218B includes portions 44B of the reflective bottom surface 26 extending inward into the waveguide 12. The portions 44B that extend inward into the body 22 of the waveguide 12 includes surfaces 46B that are adapted to reflect the duplicate image beams 114, 214, 314 such that the duplicate image beams 114, 214, 314 are parallel to one another and equally spaced.

Figure 8:
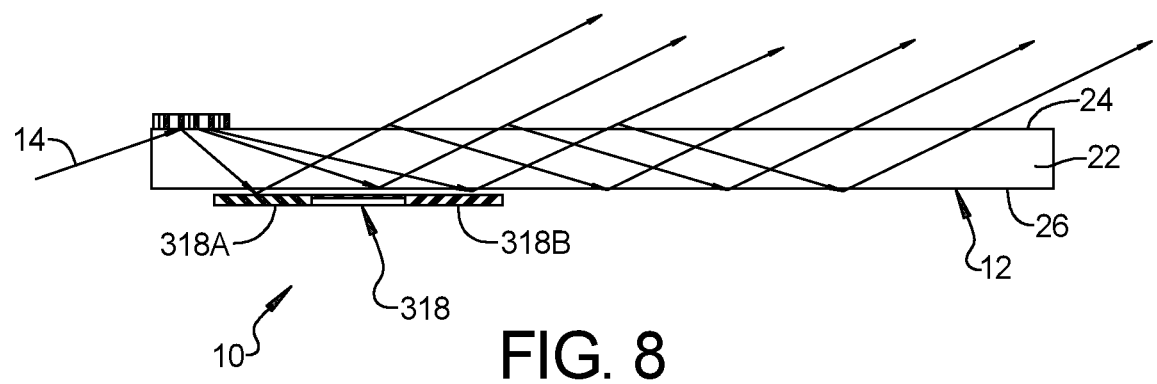
FIG. 8 is schematic side sectional view of a pupil replicator having holographic optical elements.

Referring to FIG. 8, in another exemplary embodiment, the beam aligning device 318 includes at least one holographic optical element 318A, 318B. Holographic optical elements (HOES) are holograms that duplicate the performance of optical components, such as lenses. In this application, a hologram is used to transform the properties of a wavefront, just as some other optical component would. A holographic recording of a component like a lens will have the same optical properties as the component. It will focus light in the same way that the lens would. As used herein, the holographic optical element 318A, 318B duplicates the performance of a diffraction grating to change the angle of a light beam, here the duplicate image beams 114, 214, 314. Holographic diffraction gratings are made by recording the interference pattern formed where two beams from a laser intersect. In an exemplary embodiment, holographic optical elements are made by exposing a photosensitive layer on top of a substrate. Chemical treatment of the film selectively dissolves it to form a relief pattern on the substrate. This pattern can then be used as a transmission grating or is coated with a thin metallic layer to produce a reflection grating. In this way, a holographic optical element 318A, 318B can includes a reflective hologram that is written into a carrier material (substrate) and attached to the reflective bottom surface 26 of the waveguide 12. An air-glass interface 48 of the reflective bottom surface 26 has a reflectivity of 100%. The beam falls on this interface at an angle equal to or larger than a critical angle and therefore, total internal reflection (TIR) happens. When a holographic optical element 318A, 3188 is placed thereon, the reflective bottom surface 26 will provide alteration of the angle of the duplicate image beams 114, 214, 314 along with reflecting the duplicate image beams 114, 214, 314 such that the duplicate image beams 114, 214, 314 are reflected upward toward the transmissive top surface 24 of the waveguide 12 parallel to one another and equally spaced.

The first duplicate image beam 114 is reflected by a first holographic optical element 318A such that the first duplicate image 114 is reflected upward toward the transmissive top surface 24 of the waveguide 12 at a thirty degree angle. The second duplicate image beam 214 is already travelling at a thirty degree angle relative to the vertical axis 42, and therefore, is reflected by the reflective bottom surface 26 of the waveguide 12 without modification by a holographic optical element 318. The third duplicate image beam 314 is reflected by a second holographic optical element 318B such that the third duplicate image 314 is reflected upward toward the transmissive top surface 24 of the waveguide 12 at a thirty degree angle. Thus, after being reflected by the beam aligning device 18, here holographic optical elements 318A, 318B, each of the three duplicate image beams 114, 214, 314 travels within the waveguide 12 parallel to one another and at a thirty degree angle relative to the waveguide 12 and equally spaced.

The body 22 of the waveguide 12 transmits 100% of incident light. The transmissive top surface 24 includes different transmission levels at different locations. The transmissive top surface 24 may be one or more dielectric layers with different regions designed to provide predetermined transmission and reflectivity characteristics. Alternatively, the transmissive top surface 24 may include metallic nanowires (e.g., silver) or metallic nanoparticles (e.g., gold) with different area density to provide predetermined transmission and reflectivity characteristics in different regions, respectively. Alternatively, the transmissive top surface 24 may be a refractive index mismatched interface (e.g., a photopolymer with controlled degree of polymerization) designed to provide predetermined transmission and reflectivity characteristics at different regions, respectively. Alternatively, the transmissive top surface 24 may be or include an extraction holographic optical element 50 designed to provide predetermined transmission and reflectivity characteristics at different regions, respectively. The transmissive top surface 24 may be applied to the body 22 of the waveguide 12 via an adhesive or applied to the transmissive tap surface 24 in another suitable manner, or formed, written or etched directly into the body 22 of the waveguide 12.

The transmittance level of the transmissive top surface 24 may increase moving away from the location where the incoming image beam 14 is received within the body 22 of the waveguide 12. For example, Referring to FIG. 9, in an exemplary embodiment, the transmissive top surface 24 includes a first region 52 and a second region 54, and wherein, for each of the duplicate image beams 114, 214, 314 a first identical replication 114A, 214A, 314A of the incoming image beam 14 is transmitted through the transmissive top surface 24 within the first region 52, and a second identical replication 114B, 214B, 314B of the incoming image beam 14 is transmitted through the transmissive top surface 24 within the second region 54.

Figure 9:
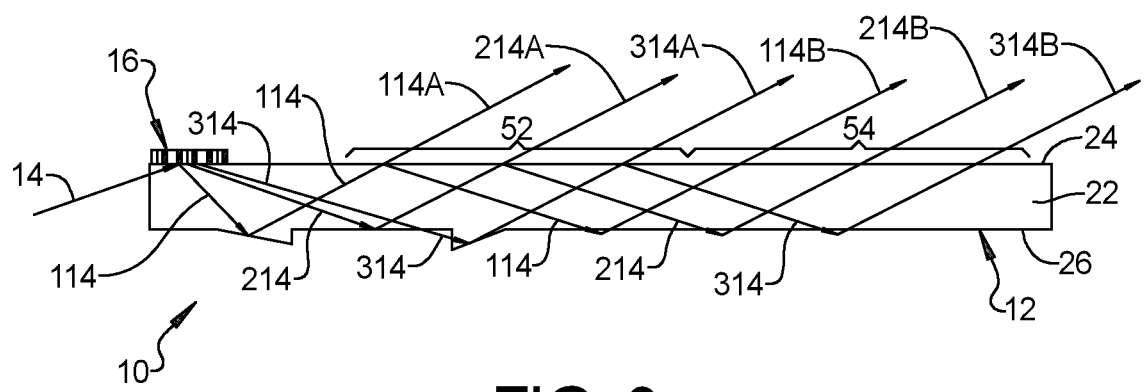
FIG. 9 is a schematic side sectional view of the pupil replicator shown in FIG. 1, wherein the transmissive top surface includes first and second regions.

Thus, as shown in FIG. 9, in the first region 52, a first identical replication 114A of the first duplicate image beam 114 is transmitted through the transmissive top surface 24, a first identical replication 214A of the second duplicate image beam 214 is transmitted through the transmissive top surface 24, and a first identical replication 314A of the third duplicate image beam 314 is transmitted through the transmissive top surface 24. Further, in the second region 54, a second identical replication 114B of the first duplicate image beam 114 is transmitted through the transmissive top surface 24, a second identical replication 214E of the second duplicate image beam 214 is transmitted through the transmissive top surface 24, and a second identical replication 314B of the third duplicate image beam 314 is transmitted through the transmissive top surface 24.

Each of the first and second identical replications 114A, 114B, 214A, 214B, 314A, 314B of the first, second and third duplicate image beams 114, 214, 314 must be identical and of equal intensity, thus, the level of transmittance within the second region 54 is greater than the level of transmittance in the first region 52. In an exemplary embodiment, the first region 52 of the transmissive top surface 24 allows a first predetermined level of transmittance, and the second region 54 of the transmissive top surface 24 allows a second predetermined level of transmittance, the second predetermined level of transmittance being greater than the first predetermined level of transmittance. For example, the predetermined level of transmittance of the first region 52 may be 50%, and the predetermined level of transmittance of the second region may be 100%. Thus, the intensity of the first identical replications 114A, 214A, 314A of the first, second and third duplicate image beams 114, 214, 314 matches the intensity of the second identical replications 114B, 214B, 314B of the first, second and third duplicate image beams 114, 214, 314. It should be understood by those skilled in the art that there may be any number of transmittances for each of the duplicate image beams 114, 214, 314. Here we have shown and discussed two transmittances, however, there could be any suitable number such as three, four, six or ten, for example. For example, there may be four regions, wherein the predetermined level of transmittance in the first region is 25%, the predetermined level of transmittance in the second region is 33%, the predetermined level of transmittance in the third region is 50%, and the predetermined level of transmittance in the fourth region is 100%. The predetermined level of transmittance for each region is dependent upon the number of regions and is calculated to ensure that the intensity of all of the transmitted identical replications of the incoming image beam 14 are identical and of equal intensity.

A pupil replicator of the present disclosure offers several advantages. These include allowing a waveguide 12 to be designed thinner than has been conventionally possible by using a Dammann grating 16 to create duplicate image beams 114, 214, 314, thus keeping the gap between adjacent transmitted image beams small enough to ensure a quality image is received by a user.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A pupil replicator for a head up display system, comprising:
   a waveguide including a transparent body having a partially transmissive top surface and a reflective bottom surface and adapted to receive an incoming image beam;
   a Dammann grating adapted to create a plurality of duplicate image beams, and reflect each of the plurality of duplicate image beams within the waveguide, each duplicate image beam having equal intensity and each duplicate image beam being identical to the incoming image beam; and
   a beam aligning device, including a plurality of beam aligning prisms, and adapted to reflect each of the plurality of duplicate image beams at a common angle relative to the waveguide, wherein, after being reflected by the beam aligning device, each of the plurality of duplicate image beams are parallel to one another.

2. The pupil replicator of claim 1, wherein the Dammann grating is positioned adjacent the partially transmissive top surface.

3. The pupil replicator of claim 1, wherein the Dammann grating is etched into the partially transmissive top surface.

4. The pupil replicator of claim 1, wherein the plurality of beam aligning prisms include portions of the reflective bottom surface extending outward from the waveguide.

5. The pupil replicator of claim 1, wherein the plurality of beam aligning prisms include portions of the reflective bottom surface extending inward into the waveguide.

6. The pupil replicator of claim 1, wherein an air-glass interface of the reflective bottom surface has a reflectivity of 100 percent.

7. The pupil replicator of claim 1, wherein the incoming image beam enters the transparent body of the waveguide, the transparent body of the waveguide allowing 100 percent transmittance of the incoming image beam into the transparent body of the waveguide.

8. The pupil replicator of claim 1, wherein the partially transmissive top surface includes at least one extraction holographic optical element.

9. The pupil replicator of claim 8, wherein the partially transmissive top surface includes a first region and a second region, and wherein, for each of the duplicate image beams:
   a first identical replication of the incoming image beam is transmitted through the partially transmissive top surface within the first region; and
   a second identical replication of the incoming image beam is transmitted through the partially transmissive top surface within the second region.

10. The pupil replicator of claim 9, wherein the first region of the partially transmissive top surface allows a first predetermined level of transmittance, and the second region of the partially transmissive top surface allows a second predetermined level of transmittance, the second predetermined level of transmittance being greater than the first predetermined level of transmittance.

11. The pupil replicator of claim 9, wherein each of the first and second identical replications of the incoming image beam for each of the duplicate image beams has the same intensity.

12. The pupil replicator of claim 9, wherein the waveguide is formed from one of glass and transparent plastic.

13. A pupil replicator for a head up display system, comprising:
   a waveguide formed from one of glass and transparent plastic, adapted to receive an incoming image beam, and including a transparent body having a transmissive top surface and a reflective bottom surface;
   a Dammann grating etched into the transmissive top surface and adapted to:
      create a plurality of duplicate image beams having equal intensity, each duplicate image beam being identical to the incoming image beam; and
      reflect each of the plurality of duplicate image beams within the waveguide; and
   a beam aligning device adapted to receive each of the plurality of duplicate image beams and to reflect each of the plurality of duplicate image beams at a common angle relative to the waveguide, wherein, after being reflected by the beam aligning device, each of the plurality of duplicate image beams are parallel to one another; and
   wherein, the incoming image beam enters the transparent body of the waveguide, the transparent body of the waveguide allowing 100 percent transmittance of the incoming image beam into the transparent body of the waveguide, and an air-glass interface of the reflective bottom surface has a reflectivity of 100 percent.

14. The pupil replicator of claim 13, wherein the beam aligning device includes a plurality of beam aligning prisms, the plurality of beam aligning prisms including one of portions of the reflective bottom surface extending outward from the waveguide and portions of the reflective bottom surface extending inward into the waveguide.

15. The pupil replicator of claim 14, wherein the transmissive top surface includes a first region adapted to allow a first predetermined level of transmittance, and a second region adapted to allow a second predetermined level of transmittance that is greater than the first predetermined level of transmittance, and wherein, for each of the duplicate image beams:
   a first identical replication of the incoming image beam is transmitted through the transmissive top surface within the first region; and
   a second identical replication of the incoming image beam is transmitted through the transmissive top surface within the second region;
   wherein, each of the first and second identical replications of the incoming image beam for each of the duplicate image beams has the same intensity.

16. The pupil replicator of claim 13, wherein the beam aligning device includes at least one holographic optical element that includes a reflective hologram written into a carrier material which is attached to the reflective bottom surface of the waveguide.

17. An automobile incorporating a pupil replicator for a head up display system therein, the pupil replicator comprising:
   a waveguide formed from one of glass and transparent plastic, adapted to receive an incoming image beam, and including a transparent body having a transmissive top surface and a reflective bottom surface;
   a Dammann grating etched into the transmissive top surface and adapted to:
      create a plurality of duplicate image beams having equal intensity, each duplicate image beam being identical to the incoming image beam; and
      reflect each of the plurality of duplicate image beams within the waveguide; and
   a beam aligning device adapted to receive each of the plurality of duplicate image beams and to reflect each of the plurality of duplicate image beams at a common angle relative to the waveguide, wherein, after being reflected by the beam aligning device, each of the plurality of duplicate image beams are parallel to one another; and
   wherein, the incoming image beam enters the transparent body of the waveguide, the transparent body of the waveguide allowing 100 percent transmittance of the incoming image beam into the transparent body of the waveguide, and an air-glass interface of the reflective bottom surface has a reflectivity of 100 percent.

* * * * *